(12) United States Patent
Shaikh et al.

(10) Patent No.: US 9,116,726 B2
(45) Date of Patent: Aug. 25, 2015

(54) VIRTUAL DISK SNAPSHOT CONSOLIDATION USING BLOCK MERGE

(71) Applicant: VMware, Inc., Palo Alto, CA (US)

(72) Inventors: Faraz Shaikh, Sunnyvale, CA (US); Krishna Yadappanavar, Sunnyvale, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 189 days.

(21) Appl. No.: 13/630,099

(22) Filed: Sep. 28, 2012

(65) Prior Publication Data

US 2014/0095823 A1   Apr. 3, 2014

(51) Int. Cl.
*G06F 9/455* (2006.01)
*G06F 12/02* (2006.01)

(52) U.S. Cl.
CPC ............ *G06F 9/455* (2013.01); *G06F 9/45533* (2013.01); *G06F 12/02* (2013.01)

(58) Field of Classification Search
USPC ........... 711/100, 161, 162, 220; 707/639, 646
See application file for complete search history.

(56) References Cited

U.S. PATENT DOCUMENTS

| 7,606,868 | B1* | 10/2009 | Le et al. ................... 709/211 |
| 7,934,064 | B1* | 4/2011 | Per et al. ................... 711/161 |
| 7,941,619 | B1* | 5/2011 | Rossi ....................... 711/162 |
| 8,281,093 | B1* | 10/2012 | Krishnan et al. ........... 711/162 |
| 8,560,787 | B2* | 10/2013 | Hutchison et al. ......... 711/162 |
| 8,688,935 | B1* | 4/2014 | Yochai et al. ............. 711/162 |
| 2005/0193272 | A1* | 9/2005 | Stager et al. .............. 714/42 |
| 2010/0049929 | A1* | 2/2010 | Nagarkar et al. .......... 711/162 |
| 2011/0208929 | A1* | 8/2011 | McCann .................... 711/162 |
| 2011/0225124 | A1* | 9/2011 | Agombar et al. .......... 707/639 |
| 2013/0263119 | A1* | 10/2013 | Pissay et al. .............. 718/1 |

* cited by examiner

*Primary Examiner* — Nathan Sadler

(57) ABSTRACT

A virtualized computer system employs a virtual disk. Multiple snapshots of the virtual disk can be created. After a snapshot is created, writes to the virtual disk are captured in delta disks. Two snapshots are consolidated by updating block references in snapshot meta data. Block reference update takes advantage of the fact that blocks for the two snapshot are managed within the same storage container and, therefore, can be moved in the snapshot logical space without incurring data copy operations. Consolidation of delta disks also gracefully handles failures during the consolidation operation and can be restarted anew after the system has recovered from failure.

20 Claims, 7 Drawing Sheets

VIRTUAL DISK SNAPSHOT CONSOLIDATION USING BLOCK MERGE

BACKGROUND

Computer virtualization is a technique that involves encapsulating a physical computing machine platform into a virtual machine that is executed under the control of virtualization software on a hardware computing platform, or "host." A virtual machine has both virtual system hardware and guest operating system software. Virtual system hardware typically includes at least one "virtual disk," which is represented as a single file or a set of files in the host's file system, and appear as a typical storage drive to the guest operating system. The virtual disk may be stored on the host platform's local storage device (if any) or on a remote storage device. Typically, a virtual machine uses the virtual disk in the same manner that a physical storage drive is used, to store the guest operating system, application programs, and application data.

A snapshot of the virtual disk can be taken at a given point in time to preserve the content within the virtual disk at that point in time, referred to herein as a "point in time (PIT) copy of the virtual disk." Once a snapshot of a virtual disk is created, subsequent writes received from the guest operating system to the virtual disk are captured in a "delta disk" so that the preserved content, i.e., the base PIT copy, is not modified. The delta disk is an additional file associated with the virtual disk. At any given time, represents the difference between the current state of the virtual disk and the state at the time of the previous snapshot. Thus, the base PIT copy remains intact and can be reverted back to or can be used as a base template to create writable virtual disk clones. Multiple PIT copies of the virtual disk can be created at various points in time by creating snapshots of snapshots. Each snapshot corresponds to a separate delta disk that is overlaid on a previous delta disk.

Creating multiple snapshots of a virtual disk results in a long chain of delta disks, each corresponding to a snapshot of the virtual disk. Every read IO operation to the virtual disk has to traverse through each delta disk associated with the virtual disk to get the latest copy of the data from a delta disk. Therefore, an increased number of delta disks negatively impacts the performance of read IO operations to the virtual disk. Performance of such IO operations may be increased when redundant delta disks are consolidated to reduce the number of delta disk in a given chain. Redundant delta disks are associated with PIT copies of the virtual disk that are no longer needed. For example, a PIT copy of the virtual disk may created for backing up or testing purposes and becomes redundant upon backup completion or when the testing is successful.

Delta disks are consolidated by merging PIT copies such that a particular delta disk can be deleted. Merging the PIT in copies typically involves copying out data from the delta disk to be deleted (the "source delta disk") to the main primary disk or an adjacent delta disk (either, referred to generally as the "destination delta disk"). Copying data in such a manner from the source delta disk to the destination delta disk involves data movement operations that cost a significant amount of IO and CPU resources. As the size of data in the source delta disk increases, the data movement operations that are necessary to consolidate two delta disks becomes very IO intensive. Thus, during consolidation, the IO performance for the virtual disk as a whole degrades drastically when a delta disk consolidation operation is in process.

As the foregoing illustrates, what is needed in the art is a mechanism for consolidating delta disks with minimal impact to IO operation performance within the virtual disk and minimal data transfer overheads.

SUMMARY

One or more embodiments of the present invention provide techniques for consolidating snapshots of a virtual disk in a manner that eliminates the need of data movement from one delta disk to another.

A method for consolidating a plurality of delta disk included in a delta disk chain associated with a virtual disk. The method includes the step of determining that a first delta disk included in the delta disk chain is to be consolidated with a second delta disk included in the delta disk chain, where, once consolidated, the second delta disk is to be removed from the delta disk chain. The method also includes the steps of determining that a first data block in the first delta disk corresponds to a second data block in the second delta disk, wherein the second data block stores data reflecting an update to data stored in the first data block, and modifying a reference included in metadata for the first delta disk that points to the first data block to point to a second data block included in the second delta disk Embodiments of the present invention further include a non-transitory computer-readable storage medium storing instructions that when executed by a computer system cause the computer system to perform one or more of the methods set forth above, and a computer system that is configured to carry out one or more of the methods set forth above.

DETAILED DESCRIPTION

Figure 1:
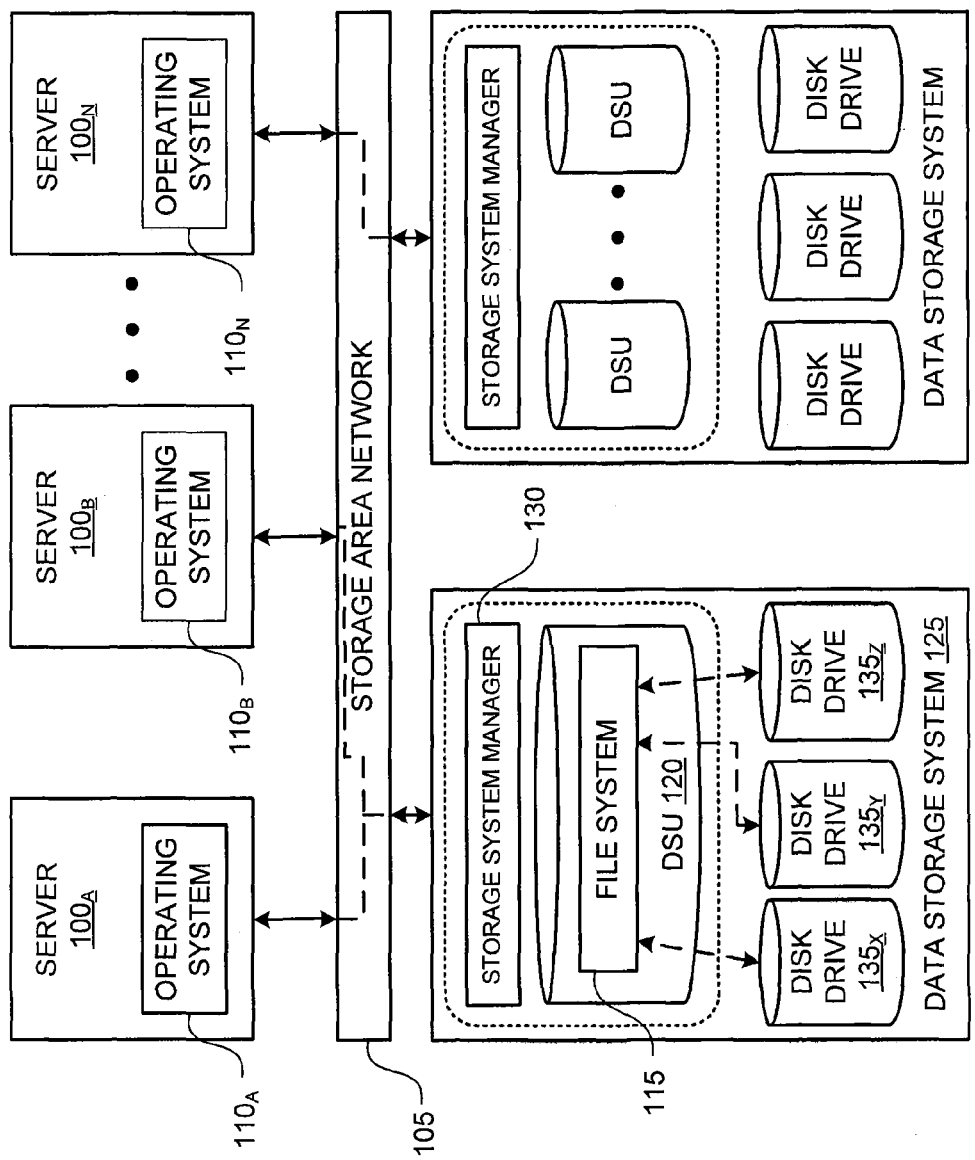
FIG. 1 is a computer system configuration utilizing a shared file system, according to an embodiment.

FIG. 1 is a computer system configuration utilizing a shared file system, according to an embodiment. The computer system configuration of FIG. 1 includes multiple servers $100_A$ to $100_N$ each of which is connected to storage area network (SAN) 105. Operating systems $110_A$ and $110_B$ on servers $100_A$ and $100_B$ interact with a shared file system 115 that resides on a data storage unit (DSU) 120 accessible through SAN 105. In particular, data storage unit 120 is a logical unit (LUN) of a data storage system 125 (e.g., disk array) connected to SAN 105. While DSU 120 is exposed to operating systems $110_A$ to $110_B$ by system storage manager 130 (e.g., disk controller) as a contiguous logical storage space, the actual physical data blocks upon which shared file system 115 may be stored is dispersed across the various physical disk drives $135_X$ to $135_Z$ of data storage system 125.

Data in DSU 120 (and possibly other DSUs exposed by the data storage systems) are accessed and stored in accordance with structures and conventions imposed by shared file system 115 which, for example, stores such data as a plurality of files of various types, typically organized into one or more directories. Shared file system 115 further includes metadata data structures that store or otherwise specify information, for example, about how data is stored within shared file system 115, such as block bitmaps that indicate which data blocks in shared file system 115 remain available for use, along with other metadata data structures indicating the directories and files in shared file system 115, along with their location. Such meta data structures are typically stored in an information node (Mode) associated with a file. So that data blocks can be shared across multiple files in the file system, each data block is also associated with a reference count indicating the number of files that reference the data block. When data blocks are shared, techniques such as copy on write (COW) are implemented to achieve isolation properties.

Figure 2:
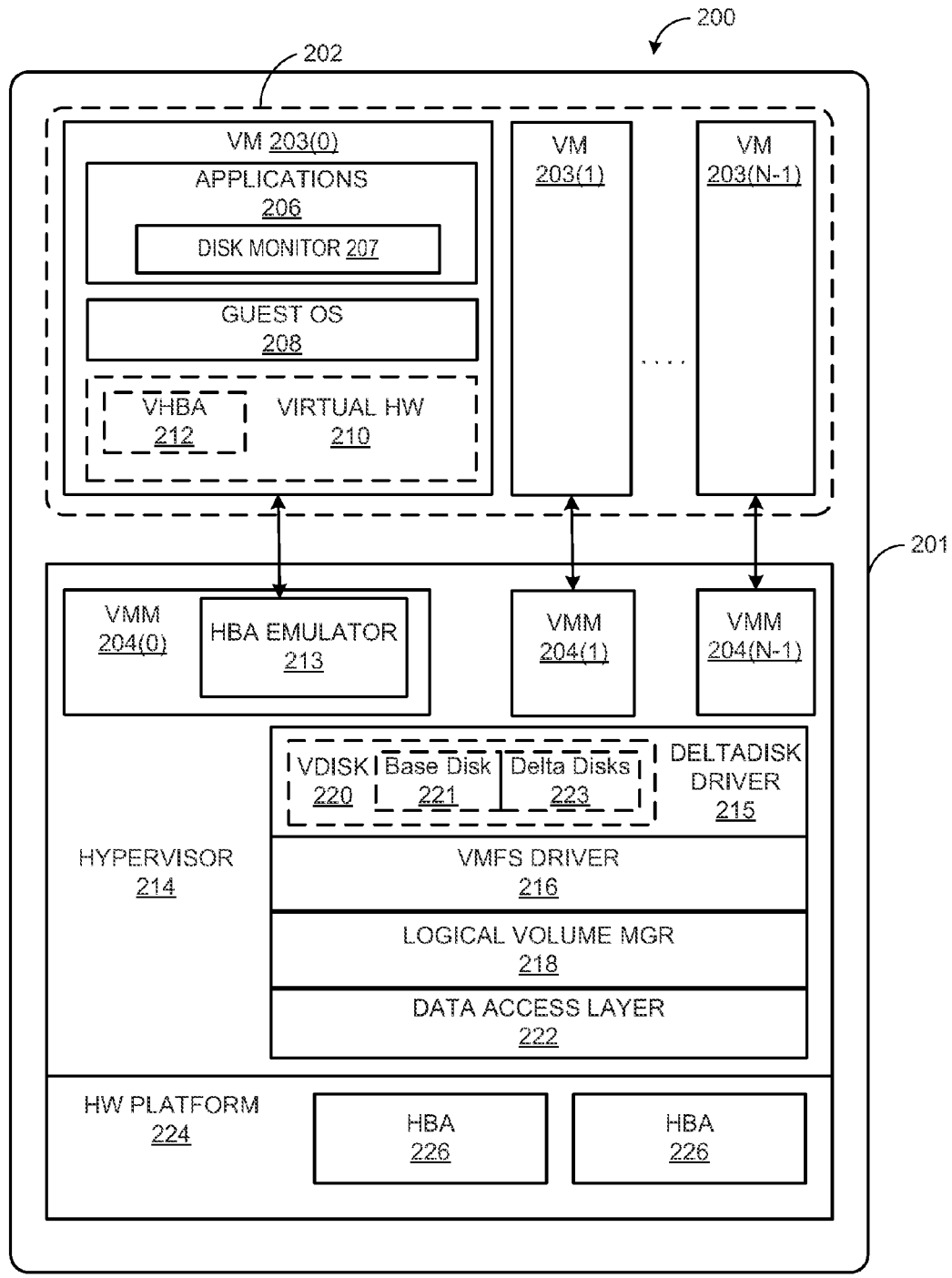
FIG. 2 is a virtual machine based computer system, according to an embodiment.

FIG. 2 is a virtual machine based computer system 200, according to an embodiment. A computer system 201, generally corresponding to one of the servers 100, is constructed on a conventional, typically server-class hardware platform 224, including, for example, host bus adapters (HBAs) 226 that network computer system 201 to remote data storage systems, in addition to conventional platform processor, memory, and other standard peripheral components (not separately shown). Hardware platform 224 is used to execute a hypervisor 214 (also referred to as virtualization software) supporting a virtual machine execution space 202 within which virtual machines (VMs) 203 can be instantiated and executed. For example, in one embodiment, hypervisor 214 may correspond to the vSphere product (and related utilities) developed and distributed by VMware, Inc., Palo Alto, Calif. although it should be recognized that vSphere is not required in the practice of the teachings herein.

Hypervisor 214 provides the services and support that enable concurrent execution of virtual machines 203. Each virtual machine 203 supports the execution of a guest operating system 208, which, in turn, supports the execution of applications 206. Examples of guest operating system 208 include Microsoft® Windows®, the Linux® operating system, and NetWare®-based operating systems, although it should be recognized that any other operating system may be used in embodiments. Guest operating system 208 includes a native or guest file system, such as, for example, an NTFS or ext3FS type file system. The guest file system may utilize a host bus adapter driver (not shown) in guest operating system 208 to interact with a host bus adapter emulator 213 in a virtual machine monitor (VMM) component 204 of hypervisor 214. Conceptually, this interaction provides guest operating system 208 (and the guest file system) with the perception that it is interacting with actual hardware.

FIG. 2 also depicts a virtual hardware platform 210 as a conceptual layer in virtual machine 203(0) that includes virtual devices, such as virtual host bus adapter (HBA) 212 and virtual disk 220, which itself may be accessed by guest operating system 208 through virtual HBA 212. In one embodiment, the perception of a virtual machine that includes such virtual devices is effectuated through the interaction of device driver components in guest operating system 208 with device emulation components (such as host bus adapter emulator 213) in VMM 204(0) (and other components in hypervisor 214).

File system calls initiated by guest operating system 208 to perform file system-related data transfer and control operations are processed and passed to virtual machine monitor (VMM) components 204 and other components of hypervisor 214 that implement the virtual system support necessary to coordinate operation with hardware platform 224. For example, HBA emulator 213 functionally enables data transfer and control operations to be ultimately passed to the host bus adapters 226. File system calls for performing data transfer and control operations generated, for example, by one of applications 206 are translated and passed to a virtual machine file system (VMFS) driver 216 that manages access to files (e.g., virtual disks, etc.) stored in data storage systems (such as data storage system 125) that may be accessed by any of the virtual machines 203. In one embodiment, access to DSU 120 is managed by VMFS driver 216 and shared file system 115 for LUN 120 is a virtual machine file system (VMFS) that imposes an organization of the files and directories stored in DSU 120, in a manner understood by VMFS driver 216. For example, guest operating system 208 receives file system calls and performs corresponding command and data transfer operations against virtual disks, such as virtual SCSI devices accessible through HBA emulator 213, that are visible to guest operating system 208. Each such virtual disk may be maintained as a file or set of files stored on VMFS, for example, in DSU 120. The file or set of files may be generally referred to herein as a virtual disk and, in one embodiment, complies with virtual machine disk format specifications promulgated by VMware (e.g., sometimes referred to as a vmdk files). File system calls received by guest operating system 208 are translated to instructions applicable to particular file in a virtual disk visible to guest operating system 208 (e.g., data block-level instructions for 4 KB data blocks of the virtual disk, etc.) to instructions applicable to a corresponding vmdk file in VMFS (e.g., virtual machine file system data block-level instructions for 1 MB data blocks of the virtual disk) and ultimately to instructions applicable to a DSU exposed by data storage unit 125 that stores the VMFS (e.g., SCSI data sector-level commands). Such translations are performed through a number of component layers of an "IO stack," beginning at guest operating system 208 (which receives the file system calls from applications 206), through host bus emulator 213, VMFS driver 216, a logical volume manager 218 which assists VMFS driver 216 with mapping files stored in VMFS with the DSUs exposed by data storage systems networked through SAN 105, a data access layer 222, including device drivers, and host bus adapters 226 (which, e.g., issues SCSI commands to data storage system 125 to access LUN 120).

Deltadisk driver 215 implements snapshots for virtual disk by maintaining change delta in abstractions called delta disk chain, and providing copy-on-write semantics on these delta chains. Hypervisor 214 may take a snapshot of virtual disk 220 at a given point in time to preserve the content within virtual disk 220 at that point in time. Base disk 221 includes the content that was preserved when hypervisor 214 took the snapshot of virtual disk 220. Each data block in base disk 221 is marked as "copy-on-write."Deltadisk driver 215 captures subsequent writes received from the guest operating system 208 to virtual disk 220 in one or more delta disks 223 of virtual disk 220 so that the point in time snapshotted content in base disk 221 is not modified. In summary, the deltadisk driver 215 implements the copy-on-write logic for delta disks, and is responsible for grouping the set of delta disks and presenting it as single virtual disk in the form of a delta chain to the HBA emulator 213.

In operation, when deltadisk driver 215 receives a write operation on a data block that is marked as "copy-on-write," deltadisk driver 215 creates a copy of the data block. Deltadisk driver 215 then performs the write operation on the copy of the data block. A collection of data blocks that were created as a result of write operations associated with data blocks in the base virtual disk is a delta disk 223 of virtual disk 220. Each delta disk 223 is represented in file system 115 as a separate file having a corresponding file inode.

Deltadisk driver 215 may subsequently be instructed to create additional virtual disk snapshots at a later time. Each snapshot creates a new delta disk 223 within which subsequent write operations are captured. It is then possible to "revert" a virtual disk to any earlier state (i.e., a state marked by an earlier timestamp) by choosing which delta disk to use. Deltadisk driver 215 serves read operations received for a data block in a virtual disk with delta disks by looking up each delta disk in order of the most recent delta disk to the oldest delta disk. Subsequently, deltadisk driver 214 retrieves the most recent copy of the data block from the delta disks.

The deltadisk driver 215 is an integral part of the Hypervisor 214 which is specifically responsible for emulating snapshotting for virtual disks.

It should be recognized that the various terms, layers and categorizations used to describe the virtualization components in FIG. 2 may be referred to differently without departing from their functionality or the spirit or scope of the invention. For example, virtual machine monitors (VMM) 204 may be considered separate virtualization components between VMs 203 and hypervisor 214 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 210 may be merged with and into VMM 204 such that virtual host bus adapter 212 is removed from FIG. 2 (i.e., since its functionality is effectuated by host bus adapter emulator 213).

Figure 3:
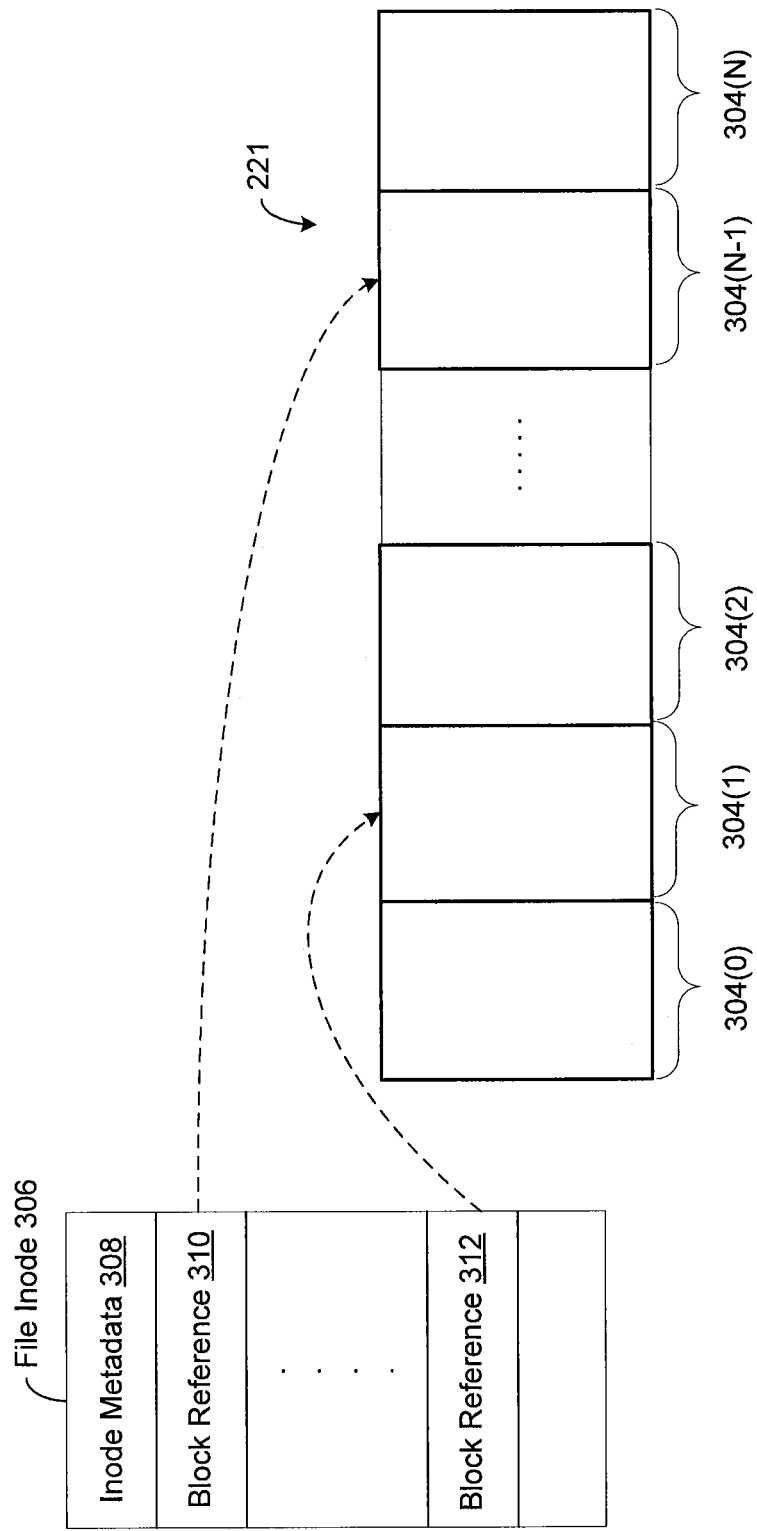
FIG. 3 illustrates a detailed view of the base disk of FIG. 2 and a file Mode associated with the base disk.

FIG. 3 illustrates a detailed view of base disk 221 of FIG. 2 and a file inode 306 associated with base disk 221. As shown, base disk 221 includes multiple data blocks 304. As previously discussed, one example of base disk 221 is a vmdk file that is stored in, for example, LUN 120.

File inode 306 specifies the logical (file space) to physical (disk space) mapping of blocks belonging to a particular file associated with file inode 306. Data belonging to the file associated with file inode 306 is stored in data blocks 304, which correspond to physical units of storage, i.e., physical data blocks, managed by file system 115. In one embodiment, the size of a particular data block 304 can range between 1 MB and 8 MB. The structure of file inode 306 is described below. Persons skilled in the art would recognize that other implementations of an inode are within the scope of this invention.

File inode 306 includes inode metadata 308 and a set of block references, such as block reference 310 and block reference 312. Inode metadata 308 stores attributes associated with the file, such as the size of the, the size and the number of data blocks 304 associated with the file, etc. Each non-empty block reference corresponds to a particular portion of the file logical space and includes the address of the particular data block 304 storing that portion of the file. For example, block reference 310 corresponds to portion A of the file and includes the address of block 304(N-1), which stores portion 'A' of the file. Similarly, block reference 312 corresponds to portion 'B' of the file and includes the address of block 304(1), which stores portion B of the file.

When, for example, VMFS driver 216 performs a read or write operation (referred to herein as an "IO operation") on a portion of a particular file (e.g., the vmdk file for base disk 221), VMFS driver 216 first accesses file inode 306 that is stored in LUN 120 to identify the specific data block(s) 304 that store the data belonging to that portion of the file. The identification process typically involves an address resolution operation performed via a block resolution function (not shown). VMFS driver 216 can then perform the IO operation on the data stored within the specific data block(s) 304 associated with the IO operation.

Figure 4A:
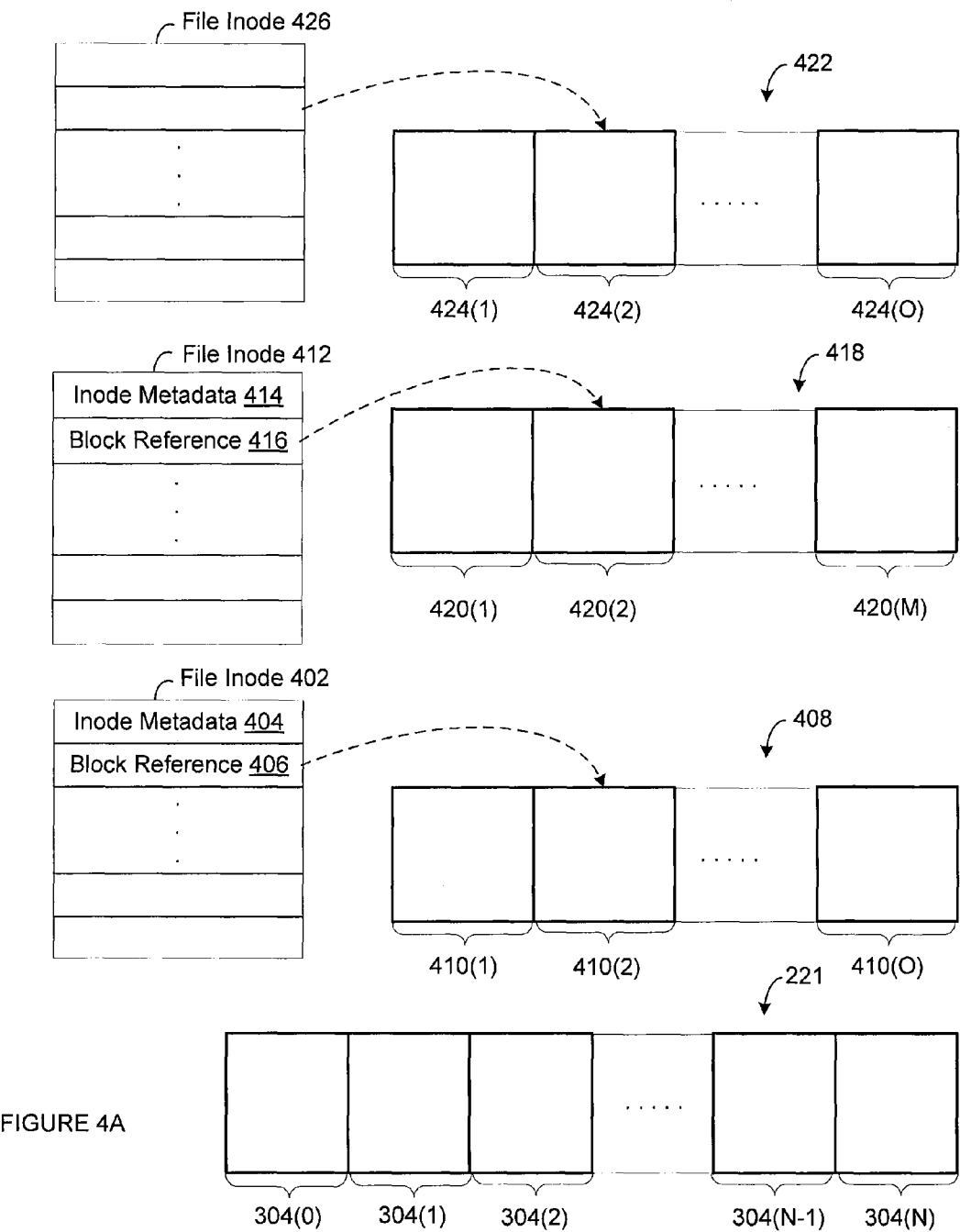
FIG. 4A illustrates delta disks generated after a snapshot of virtual disk of FIG. 3 is taken.

FIG. 4A illustrates delta disks generated after a snapshot of virtual disk 220 of FIG. 2 is taken. Virtual disk 220 is associated with delta disks 223, i.e. a chain of delta disks that includes delta disk 408, delta disk 418 and delta disk 422. Delta disk 408 includes data blocks 410, delta disk 418 includes data blocks 420 and delta disk 422 includes data blocks 424. The size of a data block 410 is the same as the size of a data block 420.

Delta disk 408 is associated with file inode 402 and corresponds to a snapshot of base disk 221 taken at a given point in time. In operation, hypervisor 214 allocates a data block 410 included in delta disk 408 in response to a write request received for performing a write operation on a corresponding data block 304 in base disk 221. Hypervisor 214 then services the write request by performing the write operation on the newly allocated data block 410. In such a manner, hypervisor 214 preserves the state of base disk 221 from the time a snapshot is taken. Once the hypervisor 214 performs the write operation on data block 410, hypervisor 214 updates block reference 406 in file inode 402 to include the address of data block 410 on which the write operation was performed.

Delta disk 418 is associated with file inode 412. Delta disk 418 corresponds to changes made to the virtual disk since the point in time when delta disk 408 was frozen as a snapshot. For delta disk 418, the deltadisk driver 215 allocates a data block 420 in response to a write request received for the original block 304 in the snapshotted base disk 221. Deltadisk driver 215 then services the write request by performing the write operation on the newly allocated data block 420. Once deltadisk driver 215 performs the write operation data block 420, deltadisk driver 215 updates block reference 416 in file inode 412 to include the address of data block 420 on which the write operation was performed.

Similarly, delta disk 422 is associated with inode 426 and corresponds to changes made to the virtual disk since the point in time when contents of delta disk 418 were frozen as a snapshot. Delta disk 422 is the currently active delta disk.

As discussed above, over time, continued creation of delta disks may create a long chain of delta disk associated with base disk 221, affecting the performance of IO operations to base disk 221. More specifically, because the number of delta disks that need to be searched increases, the latency of a read operation also increases. Performance of such IO operations may be increased when redundant delta disks are consolidated to reduce the number of delta disk in a given chain. A technique for efficiently consolidating delta disk, while minimally impacting the performance of read operations during the consolidation, is described below in conjunction with FIGS. 4B-5.

Delta disks 408, 418 and 422 are managed in the same storage container. In the described embodiment, a storage container is a file system volume. In alternative embodiments, the consolidation techniques described herein can be extended to other storage containers such as individual instances of storage arrays, volume manager etc.

Figure 4B:
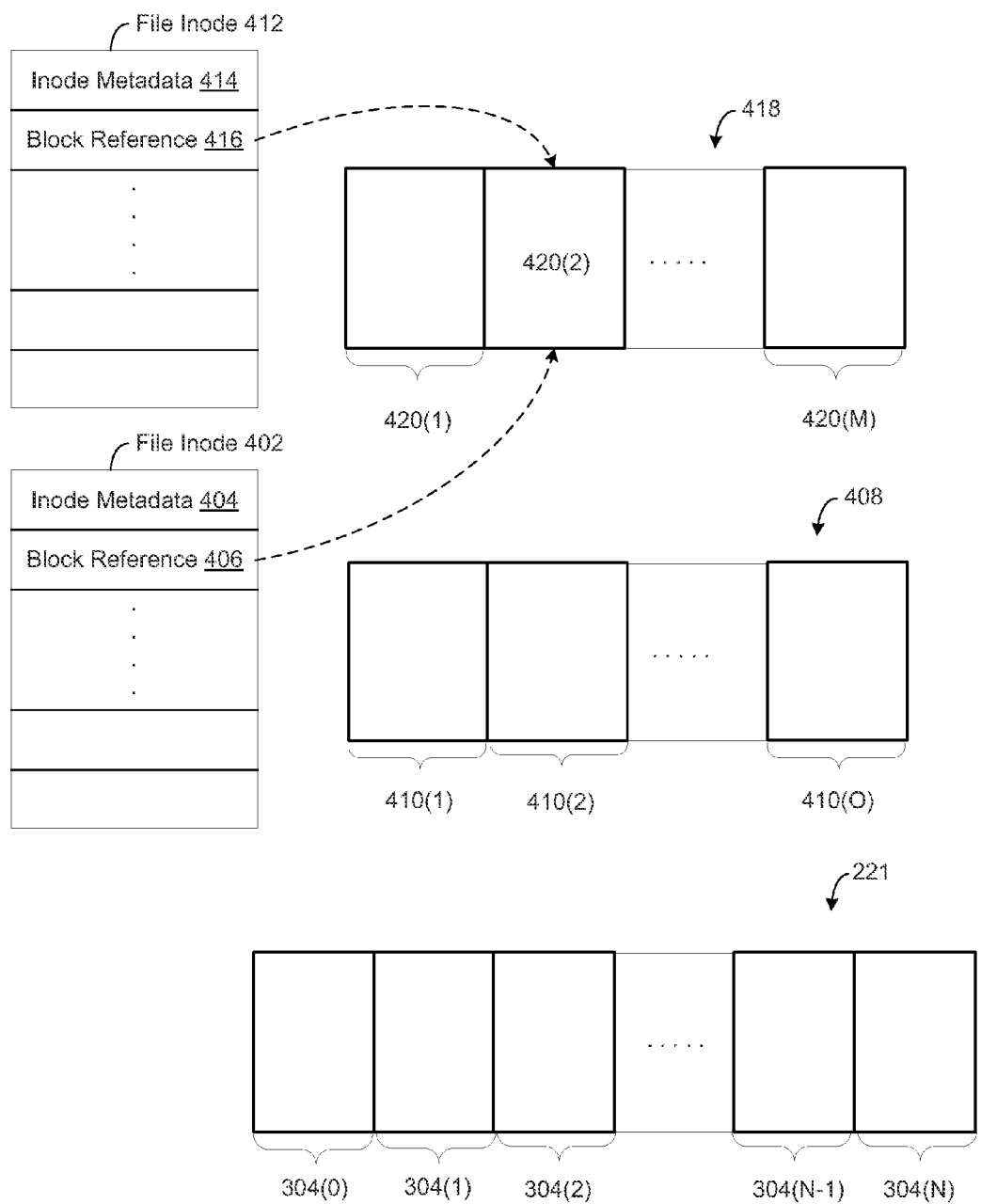
FIG. 4B illustrates the consolidation of the delta disks shown in FIG. 4A.

FIG. 4B illustrates the consolidation of the delta disks 408 and 418 shown in FIG. 4A. In operation, when hypervisor 214 receives a request to consolidate delta disk 408 ("destination delta disk 408") with delta disk 418 ("source delta disk 418"), hypervisor 214 first causes file inode 402 to "share" data blocks with file inode 412. More specifically, each block reference in file inode 402 that includes an address of a data block 410 in destination delta disk 408 is updated to reflect the address of a data block 420 in source delta disk 418 that corresponds to data block 410. For example, as illustrated in FIG. 4B, block reference 406 in file inode 402 is updated to include the address of data block 420(2) in delta disk 418 instead of an address of a data block 410 in destination delta disk 408. Once all block references in file inode 402 include addresses of data blocks 420 in source delta disk 418, data blocks 410 in destination delta disk 408 are freed and unallocated (as shown in FIG. 4B).

In one embodiment, the request to consolidate source delta disk 408 with destination delta disk 418 specifies which data block 420 in delta disk 418 corresponds to a particular data block 410 in delta disk 408 that is to be consolidated.

Figure 5A:
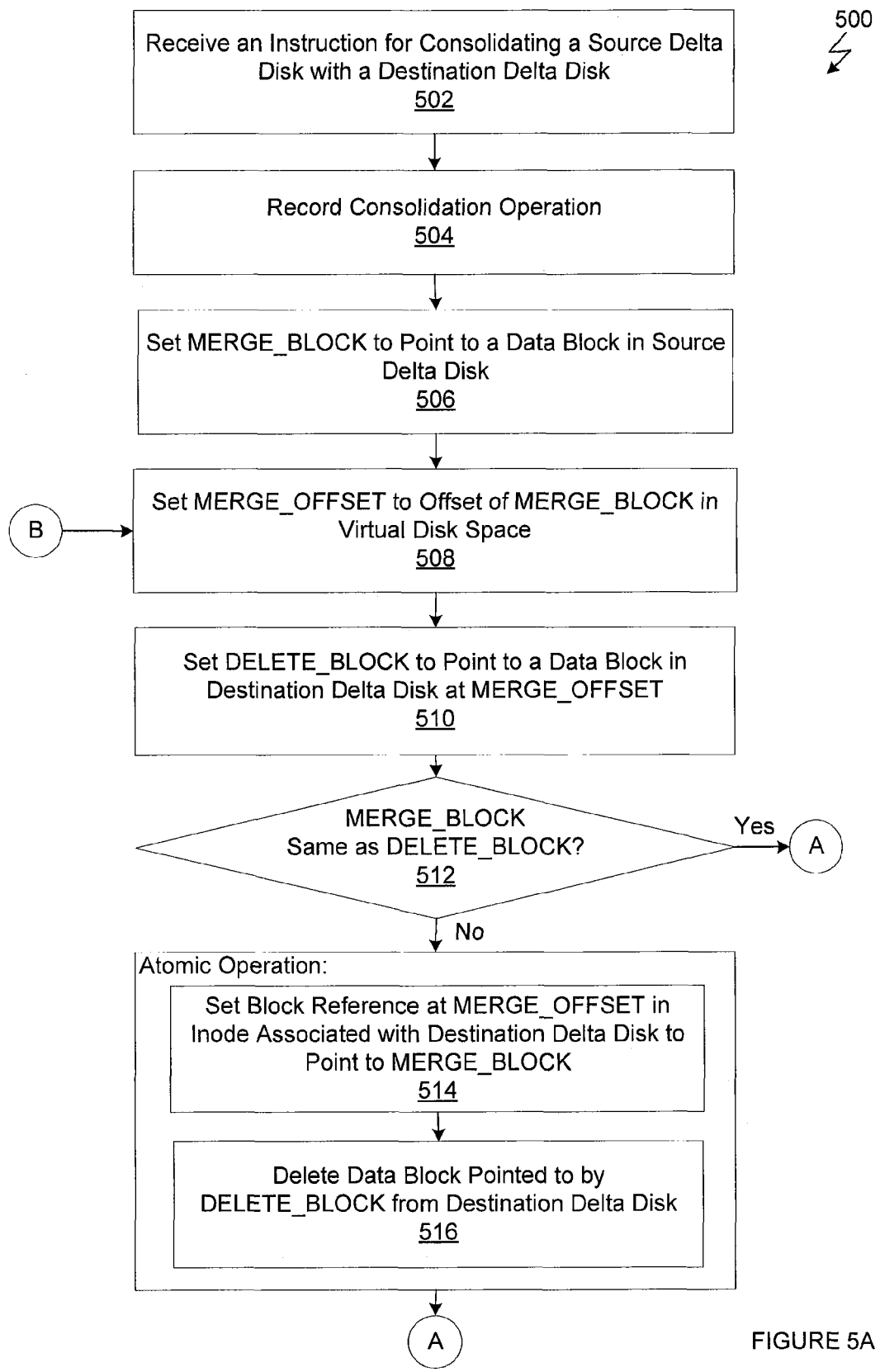
FIGS. 5A and 5B set forth a flow diagram of method steps for consolidating two delta disks corresponding to different snapshots of a virtual disk, according to one embodiment.
Figure 5B:
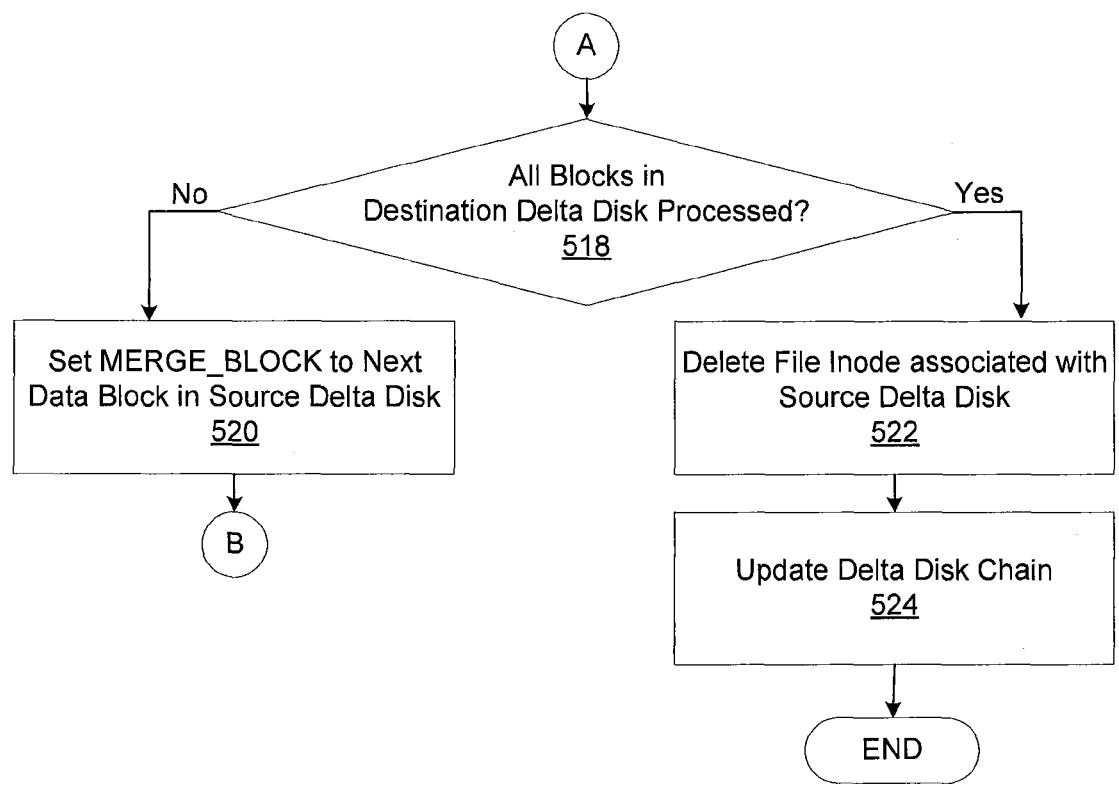

FIGS. 5A and 5B set forth a flow diagram of method steps for consolidating two delta disks corresponding to different snapshots of a virtual disk, according to one embodiment. While the example operations are depicted as being performed by the systems illustrated in FIGS. 1-2, it is contemplated that embodiments of the invention may be performed by other suitable systems.

Method 500 begins at step 502, where hypervisor 214 receives a request to consolidate a particular delta disk (referred to herein as "source delta disk") of a virtual disk with another delta disk (referred to herein as "destination delta disk") of the virtual disk. At step 504, deltadisk driver 215 updates consolidation tracking state information to indicate the start of the consolidation operation. As discussed below, deltadisk driver 215 updates the consolidation tracking information when the consolidation operation completes. Consolidation tracking state information is persisted in LUN 120. Thus, even if a system shutdown or a crash causes the consolidation operation to be interrupted before completion, the consolidation tracking state information still indicates that the consolidation operation is still in progress. In certain embodiments, once the consolidation operation is initiated, the virtual disk cannot be reverted to the source delta disk.

Deltadisk driver 215 then identifies a pair of corresponding data blocks in the source delta file and the destination delta file that need to be consolidated. In operation, at step 506, deltadisk driver 215 sets the pointer, MERGE_BLOCK, to point to a particular data block in the source delta disk. At step 508, hypervisor 214 sets a variable MERGE_OFFSET to the offset associated with the particular data block in the address space of the source delta disk. At step 510, deltadisk driver 215 identifies the data block in the destination delta disk located at MERGE_OFFSET and sets the pointer, DELETE_BLOCK, to point to the identified data block in the destination delta disk. After step 510, MERGE_BLOCK points to the particular data block in the source delta disk and DELETE_BLOCK points to the data block in the destination delta disk corresponding to the particular data block in the source delta file. In one embodiment, there is no data block in destination data block that corresponds to MERGE_BLOCK and DELETE_BLOCK is set to null.

At step 512, the deltadisk driver 215, forwards MERGE_BLOCK and DELETE_BLOCK information to the VMFS driver 216, to perform the block merge operation. VMFS driver 216 determines whether the data block being pointed to by MERGE_BLOCK is the same as the data block being pointed to by DELETE_BLOCK. In one embodiment, the data block being pointed to by MERGE_BLOCK is the same as the data block being pointed to be DELETE_BLOCK when the offsets associated with each of the data blocks is the same. Data blocks being pointed to by MERGE_BLOCK and DELETE_BLOCK may be the same when a crash occurs during a prior consolidation operation and VMFS driver 216 has already merged certain data blocks of source delta disk with corresponding data blocks of destination delta disk. If MERGE_BLOCK and DELETE_BLOCK are not the same, then the method proceeds to step 514 which perform the crux of the block merge operation.

At step 514, VMFS driver 216 within hypervisor 214 updates the reference at MERGE_OFFSET in the file inode associated with the destination delta disk to point to the data block being pointed to by MERGE_BLOCK, i.e., the particular data block in the source delta disk. At step 516, VMFS driver 216 deallocates the data block pointed to by DELETE_BLOCK and frees the data block from the destination delta disk. In one embodiment, the deallocation and freeing of the data block occurs only when DELETE_BLOCK is not null. Steps 514 and 516 are performed atomically.

At step 518, deltadisk driver 215 determines whether all the data blocks in the source delta disk have been processed in the manner discussed above. More specifically, all the data blocks in the source delta disk have been processed when the file Mode associated with the destination delta disk points to each data block that was originally in the source delta disk. If all the data blocks in the source delta disk have not been processed, then, at step 520, deltadisk driver 215 updates MERGE_BLOCK to point to the next data block in the source delta disk. Method 500 then returns to step 508 described above. If, however, all the data block in the source delta disk have been processed, then method 500 proceeds to step 522. At step 522, deltadisk driver 215 ask the VMFS driver to deletes the file mode associated with source delta disk. At step 524, the VM 203r updates the delta disk chain associated with the virtual disk to indicate that the source delta disk has been deleted.

Referring back to step 514, if the MERGE_BLOCK and DELETE_BLOCK are the same, then the method proceeds to step 518, previously described herein.

One advantage of the present technique is that delta disk consolidation is performed without any data movement operations. Specifically, data movement is not involved because delta disks are consolidated by modifying inode references. Modifying inode data block pointers involves less IO operations when compared to actually moving data that is pointed by the block pointers. Therefore, a consolidation operation performed to consolidate two delta disks is quick and results in minimal IO performance degradation of the virtual disk.

Although the inventive concepts disclosed herein are described with reference to specific implementations, many other variations are possible. For example, although the embodiments described herein refer to data block sizes of 4 KB, 1 MB and 512 KB, it should be recognized that alternative embodiments may utilize any various data block sizes consistent with the teachings herein. Further, although embodiments of processes and methods herein are described in terms of certain steps, it should be recognized that such described steps do not connote any particular ordering of such steps and that alternative embodiments may implement such steps in differing orders. Similarly, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, tables, record structures, objects and other data structures may all be implemented in different configurations, redundant, distributed, etc., while still achieving the same results. Further, the invention can be implemented in ANY context that involves consolidating snapshots of a data-set, such contexts are not limited to virtual disk snapshots.

The inventive features described herein may be applied in non-virtualized embodiments having applications running on top of an operating system and a filter driver implemented on top of a native file system driver of the operating system. The filter driver in such embodiments may be implemented in software or hardware and is configured to expose and manage thinly-provisioned files in a similar manner as the virtual disk in the virtualized embodiments.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for consolidating a plurality of delta disks included in a delta disk chain associated with a virtual disk, the method comprising:
   determining that a first delta disk included in the delta disk chain is to be consolidated with a second delta disk included in the delta disk chain, wherein, once consolidated, the second delta disk is to be removed from the delta disk chain;
   determining that a first data block in the first delta disk corresponds to a second data block in the second delta disk, wherein the second data block stores data reflecting an update to data stored in the first data block; and
   modifying a reference included in metadata for the first delta disk that points to the first data block to point to a second data block included in the second delta disk, while maintaining a reference included in metadata for the second delta disk that points to the second data block.

2. The method of claim 1, further comprising deallocating the first data block included in the first delta disk.

3. The method of claim 2, further comprising determining that the second delta disk has been fully consolidated with the first delta disk such that at least one reference in the metadata for the first delta disk points to each data block included in the second delta disk, and removing the second delta disk from the delta disk chain.

4. The method of claim 1, wherein the first data block and the second data block are of the same size.

5. The method of claim 1, further comprising determining that the first delta disk and the second delta disk should be consolidated based on a consolidation instruction received from a virtual machine served by the virtual disk.

6. The method of claim 5, further comprising identifying a first set of data blocks included in the first delta disk that are no longer needed, and identifying a second set of data blocks included in the second delta disk that each corresponds to a different data block in the first set of data blocks, wherein the first data block is included in the first set of data blocks and the second data block is included in the second set of data blocks.

7. The method of claim 6, wherein the steps of identifying the first set of data blocks and the second set of data blocks are performed based on information included in the consolidation instruction.

8. A non-transitory computer readable storage medium comprising instructions executable in a computer system to cause the computer system to carry out a method for consolidating a plurality of delta disks included in a delta disk chain associated with a virtual disk, the method comprising:
  determining that a first delta disk included in the delta disk chain is to be consolidated with a second delta disk included in the delta disk chain, wherein, once consolidated, the second delta disk is to be removed from the delta disk chain;
  determining that a first data block in the first delta disk corresponds to a second data block in the second delta disk, wherein the second data block stores data reflecting an update to data stored in the first data block; and
  modifying a reference included in metadata for the first delta disk that points to the first data block to point to a second data block included in the second delta disk, while maintaining a reference included in metadata for the second delta disk that points to the second data block.

9. The computer readable medium of claim 8, further comprising deallocating the first data block included in the first delta disk.

10. The computer readable medium of claim 9, further comprising determining that the second delta disk has been fully consolidated with the first delta disk such that at least one reference in the metadata for the first delta disk points to each data block included in the second delta disk, and removing the second delta disk from the delta disk chain.

11. The computer readable medium of claim 8, wherein the first data block and the second data block are of the same size.

12. The computer readable medium of claim 8, further comprising determining that the first delta disk and the second delta disk should be consolidated based on a consolidation instruction received from a virtual machine served by the virtual disk.

13. The computer readable medium of claim 12, further comprising identifying a first set of data blocks included in the first delta disk that are no longer needed, and identifying a second set of data blocks included in the second delta disk that each corresponds to a different data block in the first set of data blocks, wherein the first data block is included in the first set of data blocks and the second data block is included in the second set of data blocks.

14. The computer readable medium of claim 13, wherein the steps of identifying the first set of data blocks and the second set of data blocks are performed based on information included in the consolidation instruction.

15. A computer system comprising:
  a hardware platform having a processor and a memory and configured to execute a hypervisor and virtual machines (VMs), wherein one of the VMs issues a request to consolidate a plurality of delta disks included in a delta disk chain associated with a virtual disk, and wherein the hypervisor is configured to:
    determine that a first delta disk included in the delta disk chain is to be consolidated with a second delta disk included in the delta disk chain, wherein, once consolidated, the second delta disk is to be removed from the delta disk chain;
    determine that a first data block in the first delta disk corresponds to a second data block in the second delta disk, wherein the second data block stores data reflecting an update to data stored in the first data block; and
    modify a reference included in metadata for the first delta disk that points to the first data block to point to a second data block included in the second delta disk, while maintaining a reference included in metadata for the second delta disk that points to the second data block.

16. The computer system of claim 15, wherein the hypervisor is further configured to deallocate the first data block included in the first delta disk.

17. The computer system of claim 16, wherein the hypervisor is further configured to determine that the second delta disk has been fully consolidated with the first delta disk such that at least one reference in the metadata for the first delta disk points to each data block included in the second delta disk, and removing the second delta disk from the delta disk chain.

18. The computer system of claim 15, wherein the first data block and the second data block are of the same size.

19. The computer system of claim 15, wherein the hypervisor is further configured to identify a first set of data blocks included in the first delta disk that are no longer needed, and identify a second set of data blocks included in the second delta disk that each corresponds to a different data block in the first set of data blocks, wherein the first data block is included in the first set of data blocks and the second data block is included in the second set of data blocks.

20. The computer system of claim 19, wherein the steps of identifying the first set of data blocks and the second set of data blocks are performed based on information included in the request received from the VM.

* * * * *